United States Patent [19]

Estes, III et al.

[11] 3,767,902

[45] Oct. 23, 1973

[54] ENGINE MEMBER POSITION PREDICTOR

[75] Inventors: Bay E. Estes, III, Murrysville; Robert L. Anderson, Jr., Pittsburgh, both of Pa.

[73] Assignee: Essex International Inc., Fort Wayne, Ind.

[22] Filed: Dec. 12, 1972

[21] Appl. No.: 314,398

[52] U.S. Cl. ... 235/151.32, 235/92 CC, 235/92 MP
[51] Int. Cl. .................. G01c 7/30, H03k 23/00
[58] Field of Search .................. 235/151.32, 92 CC, 235/92 MP, 92 CT, 92 PL, 92 GT, 92 PE

[56] References Cited
UNITED STATES PATENTS

| | | | |
|---|---|---|---|
| 3,609,320 | 9/1971 | Tripp | 235/92 PE |
| 3,537,102 | 10/1970 | Baratto | 235/151.32 |
| 3,531,800 | 9/1970 | Brescia et al. | 235/151.32 |

Primary Examiner—Felix D. Gruber
Assistant Examiner—Errol A. Krass
Attorney—A. W. Molinare et al.

[57] ABSTRACT

The disclosure describes a system for predicting the position of a moving member of an automobile engine, such as the crankshaft. The system includes means for generating reference pulses at discrete positions of the member, such as every 90° of rotation. The system is operated by a clock generator that generates clock pulses at a high rate compared to the rate at which the reference pulses are produced. In response to a reference pulse, the clock pulses are transmitted to a first counter. The first counter successively counts the pulses to its maximum capacity, at which time an output pulse is transmitted to a second counter. When the next reference pulse is received, the number held in the first counter, the correction number, is loaded into a first storage register and the number held in the second counter, the position number, is loaded into a second storage register. The position number is loaded repeatedly into a down counter that is counted down by the clock pulses to produce a series of location pulses which predict the position of the rotating member. In response to each location pulse, the correction number is added to itself and the sum is stored in an accumulator. If the sum produced by an addition is equal to or greater than the capacity of the first counter at which an output pulse is produced, the transmission of the location signal is delayed for one clock pulse, thereby increasing the accuracy with which the location pulse predicts the position of the rotating member.

11 Claims, 2 Drawing Figures

ENGINE MEMBER POSITION PREDICTOR

BACKGROUND OF THE INVENTION

This invention relates to apparatus for controlling moving apparatus and more particularly relates to apparatus for determining the position of various engine parts during operation.

In order to control an internal combustion engine, it is important to know the position of various parts of the engine, such as the crankshaft and/or pistons, at all times. For example, in order to ignite a fuel mixture within a cylinder of the engine at the proper instant, the position of the piston within the cylinder must be known. Likewise, in order to admit fuel to a cylinder through a fuel injection nozzle at the proper time, the position of the piston and/or intake valve of the cylinder must be known. In the past, the instantaneous position of various engine parts has been determined by means of mechanical devices. However, such devices are expensive to manufacture and are subject to severe mechanical wear. As a result, various electronic methods of predicting the position of engine parts have been devised.

In one such system, metal lobes are placed at discrete intervals along the perimeter of the engine crankshaft damper and a magnetic transducer is mounted to the engine adjacent the damper so that the lobes pass by the transducer one-at-a-time as the crankshaft rotates. The transducer produces a short reference signal as each lobe passes by so that the location of the crankshaft is accurately known during the duration of the signal. Since only a limited number of lobes can be put on a crankshaft damper, the exact position of the crankshaft can be determined only at rather widely-spaced intervals. In order to provide additional accuracy, the position of the crankshaft must be interpolated or predicted between the occurrence of the reference signals.

Electronic digital circuits have been devised in order to predict the position of a crankshaft between the occurrence of reference signals. According to one such circuit, a counter is used to count clock pulses from a low speed clock between reference signals, and the number produced by the counter is loaded into a storage register. The contents of the storage register is loaded cyclically into a second counter which is counted down by a high-speed clock having a repetition rate substantially greater than the repetition rate of the low speed clock. Whenever the second counter is counted down to zero, a location signal is produced, and the second counter is reloaded and counted down again. As a result of this process, a series of location signals is produced that predicts the position of the crankshaft between the occurrence of reference signals.

Although the foregoing circuit is capable of working in theory, it exhibits a number of deficiencies that limit its overall usefulness. For example, in order to use such a circuit to control a conventional automobile engine, the high speed clock must produce pulses at a repetition rate faster than inexpensive components, such as metal oxide semiconductor (MOS) integrated circuitry, which can operate reliably. As a result, relatively expensive components must be utilized. In addition, the mechanical vibration and temperature range normally encountered in an engine compartment make it difficult to design and maintain electrical circuits that operate reliably at high repetition rates.

SUMMARY OF THE INVENTION

In order to overcome the deficiencies of the prior art apparatus, applicants have discovered a system for interpolating and predicting the position of a moving or rotating member, such as an engine crankshaft, with a high degree of accuracy which requires only a single relatively low repetition-rate clock. As a result, economical MOS integrated circuits can be utilized.

According to a principal feature of the invention, generating means are provided for generating first and second reference signals in at least one position of a moving member, such as an engine crankshaft. Clock means are also provided for generating clock pulses. A first counter means successively counts the clock pulses up to its maximum capacity. Each time the maximum capacity is reached, the first counter means produces an output pulse that is counted by a second counter means. The clock means produces pulses at a rate sufficiently great so that the maximum capacity of the first counter means is exceeded between the occurrence of the first and second reference signals. When the second reference signal is received, the first and second counter means stop counting. At that time, a position number proportional to the number located in the second counter means is transferred to a second store means and is used by processing means to generate a series of location signals generally having a period proportional to the magnitude of the position number. Since the position number is smaller than the total number of pulses counted by the first and second counter means, many location signals are produced between the occurrence of two successive reference signals. These location signals are used to predict the position of the crankshaft between reference signals. Since the processing means ignores the number counted by the first counter means, the period of location signals would be reduced by a time period dependent on the size of the number if additional correction means were not provided. In order to prevent cumulative error in the period of the location signals, a correction number proportional to the number located in the first counter means is transferred to a first store means and is used periodically to delay the transmission of a location signal. This correction process is achieved by utilizing a means for successively adding the correction number to itself and for storing the sum of each successive addition in response to each location signal. As soon as the successive addition indicates that an error of predetermined magnitude has accumulated, the transmission of the next location signal is delayed in order to more accurately predict the position of the moving member at that point in time.

By using the foregoing apparatus, a relatively low frequency clock may be used to operate the first and second counter means, as well as the processing means. As a result, low cost and reliable circuitry, such as MOS integrated circuits, may be utilized throughout the apparatus. In addition, by reducing the requisite clock frequency, the apparatus may be made more reliable throughout the range of environmental conditions encountered in an automobile engine compartment.

DESCRIPTION OF THE DRAWINGS

These and other advantages and features of the present invention will hereinafter appear in connection with the accompanying drawings wherein like numbers refer to like parts throughout, and wherein.

DESCRIPTION OF THE PREFERRED EMBODIMENT

Figure 1:
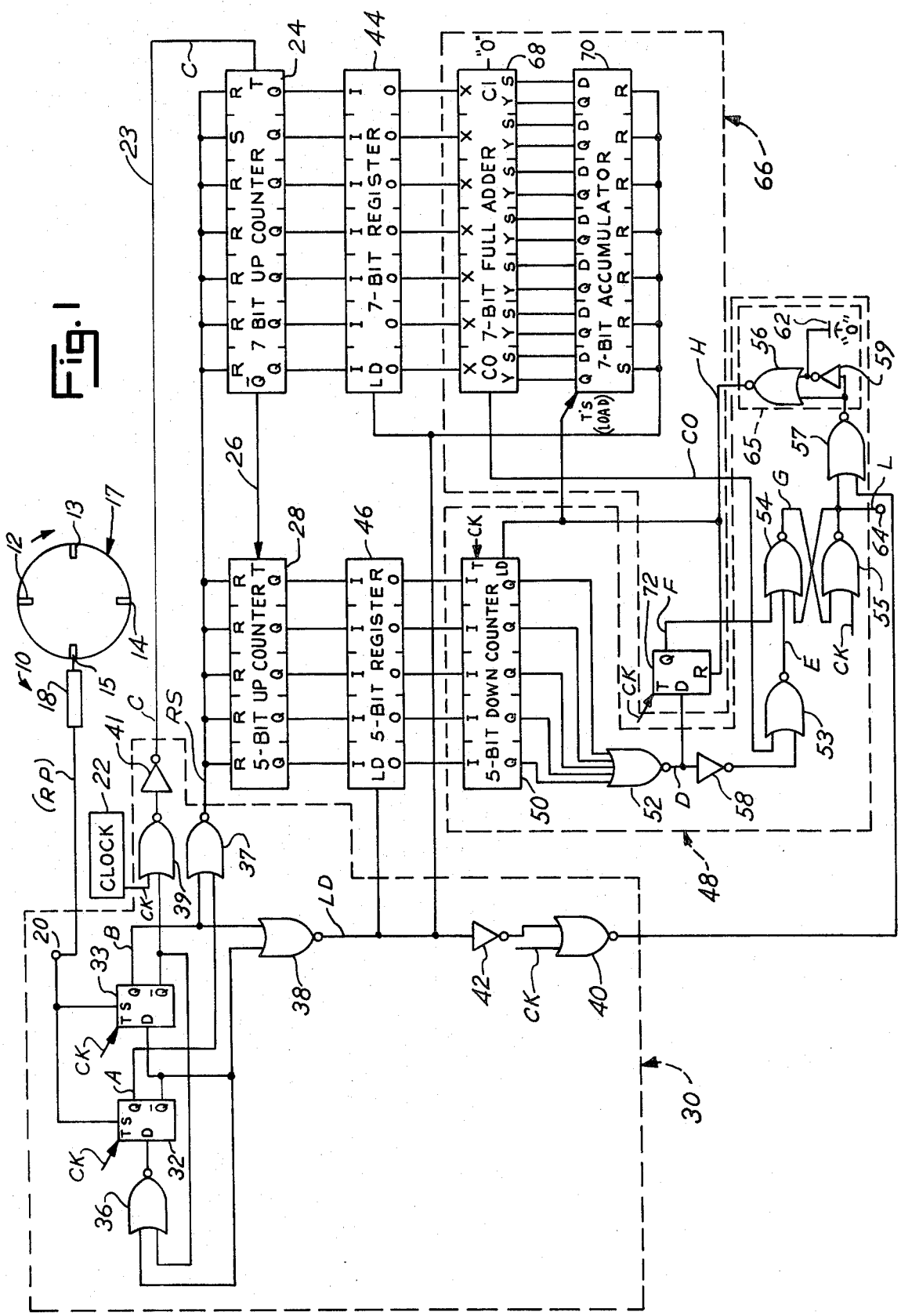
FIG. 1 is an electrical schematic drawing of a preferred form of apparatus made in accordance with the invention.

Referring to FIG. 1, a preferred form of the present invention would comprise a generating assembly 10 comprising metal lobes 12, 13, 14 and 15 spaced 90° apart on the perimeter of a crankshaft damper 17 of an exemplary automobile engine (not shown). A conventional magnetic transducer and signal conditioner 18 is fixed to the engine so that each of the lobes passes in close proximity thereto during each revolution of the crankshaft. When a lobe passes conditioner 18, a corresponding electrical signal is generated and conditioned to produce a uniform reference pulse signal RP that is transmitted over a conductor 20, thereby establishing a reference position of the crankshaft.

Clock 22 is a device for generating square wave pulses of the type illustrated by wave form CK (FIG. 2) at a repetition rate of about 100 K.Hz. Certain of the clock pulses are transmitted over a conductor 23 to the input of an electronic digital 7-bit up counter 24. The output of counter 24 is connected through a conductor 26 to the input of an electronic digital 5-bit up counter 28.

A control assembly 30 controls the operation of counters 24 and 28. The control assembly comprises D-type and flip-flops 32, 33, NOR gates 36, 37, 38, 39 and 40, and inverters 41, 42, all connected as shown.

The preferred embodiment further comprises an electronic digital 7-bit store register 44 and an electronic digital 5-bit store register 46 connected to counters 24 and 28 in the manner shown.

The data stored in register 46 is processed by processing circuit 48. Circuit 48 comprises an electronic digital 5-bit down counter 50, NOR gates 52, 53, 54, 55, 56 and 57, inverters 58, 59 and a capacitor 62. Location signals are produced by the processing circuit on conductor D. Those skilled in the art will recognize that NOR gates 54, 55 form a flip-flop circuit, and that NOR gate 56, inverter 59 and capacitor 62 form a one-shot multivibrator 65. The free end of capacitor 62 is supplied with a voltage corresponding to a 0 logical state by apparatus not shown.

The time at which certain location signals are transmitted to output terminal 64 is controlled by a correction circuit 66 comprising an electronic digital 7-bit full adder 68, an electronic digital 7-bit D-type accumulator 70, and a D-type flip-flop 72, all connected as shown.

Each of the CK inputs to the D-type flip-flops, counter 50, and NOR gate 40 is connected over a conductor (not shown) to the CK output of clock 22.

Figure 2:
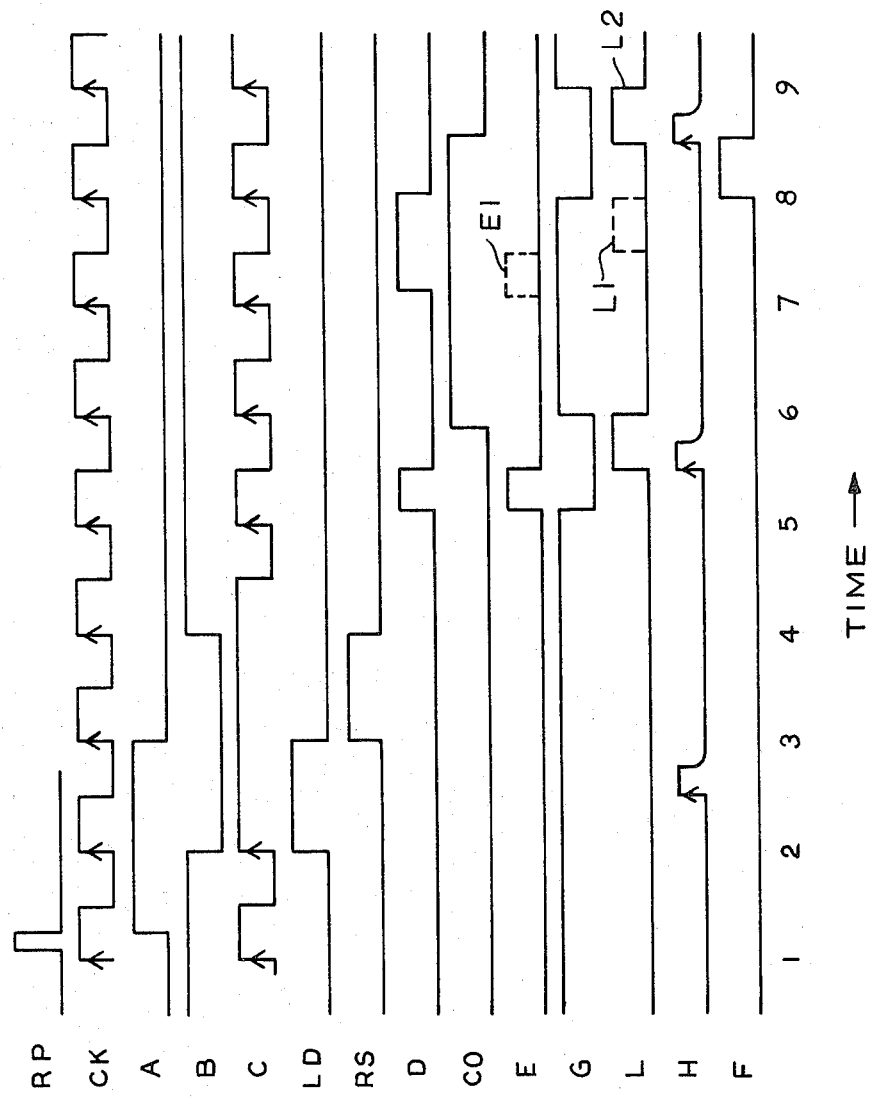
FIG. 2 is a schematic drawing of idealized voltage wave forms produced at the indicated portions of the apparatus shown in FIG. 1.

Referring to FIGS. 1 and 2, the above-described apparatus operates in the following manner. When a lobe of crankshaft 17 is moved past transducer 18, a reference pulse RP is transmitted over conductor 20. Of course, the RP pulse can be generated at any arbitrary time. However, assuming the CK output of clock 22 is switched to its logical 1 state at the time the RP pulse is generated, the Q output of flip-flop 32 (waveform A) is switched to its one state. At time 2, during the next clock pulse, (i.e., when the next clock pulse switches from its 0 state to its 1 state), the Q output of flip-flop 33 (waveform B) is switched to its 0 state, temporarily preventing the transmission of the next two clock pulses (CK) to counter 24 because counter 24 is only triggered by a transition from the 0 state to the 1 state on conductor 23. While the Q output of flip-flop 33 is in its 0 state, conductor 23 is continuously maintained in its 1 state so that no transition from the 0 state to the 1 state can occur. On the next clock pulse, at time 3, the Q output of flip-flop 32 returns to its 0 state, and on the next subsequent clock pulse, at time 4, the Q output of flip-flop 33 returns to its 1 state, thereby allowing clock pulses to again trigger counter 24 (waveform C).

As soon as the Q output of flip-flop 33 is switched to its 0 state, NOR gate 38 produces a load (LD) pulse that loads the number held in counter 28 (i.e., the position number) into register 46, loads the number held in counter 24 (i.e., the correction number) into register 44, sets the most significant bit (S) of accumulator 70 to its 1 state, and resets the other less significant bits of accumulator 70 to their 0 states.

When the Q output of flip-flop 32 is switched from its 1 state to its 0 state, NOR gate 37 produces a reset (RS) pulse that sets the second least significant bit (S) of counter 24 to its 1 state, and resets all the remaining bits of counters 24 and 28 to their 0 states. Thus, counter 24 is reset into a state which corrects for the 2 clock pulses blocked from the counter during the load and reset operations.

When the Q output of flip-flop 33 is switched to its 1 state, clock pulses are transmitted to the input of counter 24 (waveform C) and are thereafter counted up to the capacity of counter 24. Since counter 24 holds a total of seven bits, the maximum number represented by the counter is $2^7$ or 128. One pulse in every 128 pulses received by counter 24 is transmitted over conductor 26 and is counted by counter 28. As previously explained, the repetition rate of clock 22 must be set high enough so that the maximum number of pulses held in counter 24 is exceeded between the occurrence of reference pulses. Counters 24 and 28 continue to count until the next reference pulse occurs. At that point in time, the numbers held in counters 24 and 28 are loaded into registers 44 and 46, respectively, in the manner previously described. Thereafter, counters 24 and 28 are reset and again begin to count clock pulses.

After registers 44 and 46 are loaded, the number stored in register 46 is loaded into counter 50 through the operation of inverter 42, NOR gate 40, NOR gate 57, and one-shot 65. Thereafter, counter 50 counts down one digit each time a clock pulse is transmitted to its T input. As soon as counter 50 has counted down to 0, the output of NOR gate 52 is switched to its 1 state, thereby producing a location pulse (waveform D). Since the repetition rate of the clock pulses is constant, the period of the location pulses (i.e., the time duration from the beginning of one pulse to the beginning of the next pulse) is dependent on the magnitude of the position number loaded into counter 50. If conductor CO is switched to its 0 state at the time a location pulse is produced, the output of NOR gate 53 is switched to its 1 state and NOR gate 54 is enabled so that NOR gate 55 is switched to its 1 state as soon as the clock pulse is switched to its 0 state. At this time, the location pulse is transmitted to terminal 64 (waveform L). In response to the location pulse, one-shot 65 produces an output pulse that reloads counter 50 and toggles accumulator 70 so that the number entered therein is added to the number stored in register 44 by full adder 68. The sum of the addition is stored in accumulator 70. If the sum is equal to or greater than the number capacity of register 44, the CO output of adder 68 is switched to its 1 state. Under this condition, when counter 50 counts down to its 0 state, the output of NOR gate 53 cannot switch to its 1 state. Instead, on the next clock pulse (e.g., at time 8), the output of flip-flop 72 is switched to its 0 state, thereby enabling NOR gate 54. As soon as the clock pulse returns to its 0 state, NOR gate 55 is switched to its 1 state so that the location pulse (D) is transmitted to terminal 64 (waveform L). As a result of this operation, the location pulse is displaced in time by the duration of one clock pulse. This operation is clearly shown in FIG. 2, wherein waveforms E1 and L1 represent the signals which would have been transmitted if the CO conductor were switched to its 0 state, and waveform L2 represents the location pulse actually transmitted to terminal 64. It can be seen that waveform L2 is displaced in time from waveform L1 by the duration of one clock pulse.

As previously explained, the correction number stored in register 44 is successively added to itself by adder 68 and accumulator 70 in response to each location pulse. When the total stored in accumulator 70 exceeds the capacity of register 44 (i.e., the capacity of counter 24), output CO is switched to its 1 state, thereby producing a delay signal indicating that the cumulative error is sufficiently great to shift the next location pulse by the duration of one clock pulse. As a result, the location pulses are periodically repositioned in time to more accurately predict the precise position of crankshaft damper 17 between the occurrence of reference pulses.

Those skilled in the art will recognize that the preferred embodiment may be altered and modified without departing from the spirit and scope of the invention as defined in the following claims.

What is claimed is:

1. In a system for predicting the location of a moving member, improved apparatus for reducing the frequency at which the system must be operated for a predetermined degree of accuracy comprising:

generating means for generating a first reference signal and a second reference signal in at least one position of the moving member;

first counter means for counting clock pulses and for producing an output pulse in response to the receipt of a first predetermined number of clock pulses;

second counter means operatively connected to the output of the first counter means for counting output pulses received from the first counter means;

clock means for generating clock pulses at a rate sufficiently great so that the first predetermined number is exceeded between the occurrence of the first reference signal and the second reference signal;

control means for enabling the first and second counter means to count in response to the first reference signal and to terminate counting in response to the second reference signal;

first store means for storing a correction number proportional to the number counted by the first counter means in response to the first and second reference signals;

second store means for storing a position number proportional to the number counted by the second counter means in response to the first and the second reference signals;

processing means for generating a series of location signals having a period proportional to the magnitude of the position number;

means for successively adding the correction number to itself and storing the sum of each successive addition in response to each location signal;

means for delaying the production of a location signal when the sum is at least equal to a second predetermined number, whereby the location signals predict the location of the moving member between the occurrence of the first and second reference signals.

2. Apparatus, as claimed in claim 1, wherein the generating means comprises means for generating the first reference signal at a first position of the moving member and for generating the second reference signal at a second position of the moving member.

3. Apparatus, as claimed in claim 1, wherein the first and the second counter means each comprise a binary digital counter capable of representing a number having a predetermined maximum number of bits.

4. Apparatus, as claimed in claim 1, wherein the control means comprises:

means for preventing the transmission of clock pulses to the first counter means in response to each reference signal;

means for loading the number represented by the first counter means into the first store means and for loading the number represented by the second counter means into the second store means;

means for resetting the first and the second counter means; and means for transmitting clock pulses to the first counter means after the first and second counter means are reset.

5. Apparatus, as claimed in claim 4, wherein the control means further comprises means for setting the first counter means to a number equal to the number of clock pulses skipped during the operation of the means for preventing.

6. Apparatus, as claimed in claim 1, wherein the first and the second store means each comprise a digital register.

7. Apparatus, as claimed in claim 1, wherein the processing means comprises:

third counter means;

means for entering the position number in the third counter means;

means for transmitting clock pulses to the third counter means;

means for producing a location signal in response to the receipt by the third counter means of clock pulses substantially equal in number to the position number; and means for re-entering the position number in the third counter means in response to a location signal.

8. Apparatus, as claimed in claim 1, wherein the means for successively adding comprises:
- a digital adder;
- a digital accumulator;
- means for transmitting the correction number held in the first store means to the adder;
- means for transmitting the number held in the accumulator to the adder, whereby the correction number and the number held in the accumulator are added to produce a sum; and
- means for transmitting the sum to the accumulator for temporary storage.

9. Apparatus, as claimed in claim 8, wherein the means for delaying comprises:

- means for producing a delay signal when the number stored in the accumulator is substantially equal to the first predetermined number; and
- means for delaying the transmission of a location signal for the duration of one clock pulse in response to simultaneous production of a location signal and a delay signal.

10. Apparatus, as claimed in claim 1, wherein the second predetermined number comprises a number at least equal to the first predetermined number.

11. Apparatus, as claimed in claim 1, wherein the correction number equals the number counted by the first counter means and wherein the position number equals the number counted by the second counter means.

* * * * *